United States Patent [19]
Kolb et al.

[11] Patent Number: 5,756,588
[45] Date of Patent: May 26, 1998

US005756588A

[54] SCORCH SAFETY OF CURABLE FLUOROELASTOMER COMPOSITIONS

[75] Inventors: Robert E. Kolb, St. Paul; Naiyong Jing, Woodbury, both of Minn.

[73] Assignee: Minnesota Mining and Manufacturing Company, St. Paul, Minn.

[21] Appl. No.: 932,504

[22] Filed: Sep. 18, 1997

Related U.S. Application Data

[63] Continuation of Ser. No. 493,496, Jun. 22, 1995, abandoned.

[51] Int. Cl.[6] .................................................. C08F 8/00
[52] U.S. Cl. ..................... 525/326.3; 525/340; 525/353; 525/359.4; 525/384
[58] Field of Search ........................ 525/326.3, 340, 525/359.4, 384, 353

[56] References Cited

U.S. PATENT DOCUMENTS

| | | | |
|---|---|---|---|
| 3,373,139 | 3/1968 | Morgan | 260/47 |
| 3,876,654 | 4/1975 | Pattison | 260/30.4 |
| 4,233,421 | 11/1980 | Worm | 525/343 |
| 4,446,270 | 5/1984 | Guenthner et al. | 524/433 |
| 4,734,460 | 3/1988 | Yamada | 525/279 |
| 4,857,571 | 8/1989 | Reiter et al. | 524/248 |
| 4,882,390 | 11/1989 | Grootaert et al. | 525/326.3 |
| 4,912,171 | 3/1990 | Grootaert et al. | 525/340 |
| 5,086,123 | 2/1992 | Guenthner et al. | 525/276 |
| 5,262,490 | 11/1993 | Kolb et al. | 525/343 |
| 5,266,650 | 11/1993 | Guerra et al. | 525/326.4 |
| 5,399,623 | 3/1995 | Ueta et al. | 525/276 |

FOREIGN PATENT DOCUMENTS

| | | | |
|---|---|---|---|
| 71.20887 | 11/1972 | France | C08F 37/00 |

OTHER PUBLICATIONS

Product Brochure for "Fluorel® FC-2174" Commercial Chemicals Division/3M (Jun. 1984).

L. N. Lavrova et al., Russian Article entitled "Role of Calcium Hydroxide in the Dihydric Phenol Vulcanization of SKF-26 Rubber", Kauch. Rezina (1980).

V. Livshitz et al., Russian Article entitled "Dissociation Constants of Functional Derivatives of 2,2-diphenyl-hexafuoropropane and their Non-fluorinated Analogs", Institute of Element Organic Compounds of the USSR Academy of Sciences, Dec. 18, 1967.

*Primary Examiner*—Bernard Lipman
*Attorney, Agent, or Firm*—John A. Burtis

[57] ABSTRACT

This invention provides a curable fluoroelastomer composition comprising: (A) a fluorine-containing polymer or a blend of fluorine-containing polymers each comprising interpolymerized units derived from one or more fluorine-containing ethylenically unsaturated monomers; (B) an aromatic polyhydroxy crosslinking agent; (C) at least one organo-onium compound; and (D) a monohydroxyfunctional phenol. The compositions provide for a method of improving scorch safety of curable fluoroelastomer compositions.

23 Claims, No Drawings

SCORCH SAFETY OF CURABLE FLUOROELASTOMER COMPOSITIONS

This is a continuation of application No. 08/493,496, filed Jun. 22, 1995, now abandoned.

FIELD OF THE INVENTION

This invention relates to fluorocarbon elastomers and their curing. In another aspect it relates to improved scorch safety of curable fluoroelastomers.

BACKGROUND OF THE INVENTION

Fluorocarbon elastomers are synthetic elastomeric polymers with a high fluorine content—see, for example, W. M. Grootaert., G. H. Millet, & A. T. Worm. Fluorocarbon Elastomers, 8 Kirk-Othmer Encyclopedia Of Chemical Technology 990–1005 (4th ed. 1993). Fluorocarbon elastomers, particularly the copolymers of vinylidene fluoride with other ethylenically unsaturated halogenated monomers such as hexafluoropropene ($C_3F_6$) have become the polymers of choice for high temperature applications, such as seals, gaskets, and linings. These polymers exhibit favorable properties against the exposure to aggressive environments such as solvents, lubricants, and oxidizing or reducing agents. Additionally, these polymers can be compounded and cured to have high tensile strength, good tear resistance, and low compression set.

Presently used curing agents for fluoroelastomers include aromatic polyhydroxy crosslinking agents, such as polyphenols, used in combination with certain organo-onium vulcanization accelerators. U.S. Pat. Nos. 4,882,390 (Grootaert et al.), 4,912,171 (Grootaert et al.) and 5,086,123 (Guenthner et al.), for example, describe these compounds.

In accordance with conventional curing processes, desired amounts of compounding ingredients and other conventional adjuvants or ingredients are added to the unvulcanized fluorocarbon elastomer stock and intimately admixed or compounded therewith by employing any of the usual rubber mixing devices such as Banbury mixers, roll mills, or any other convenient mixing device. The temperature of the ingredients during mixing typically will not rise above 120° C. During mixing, the components and adjuvants are distributed throughout the fluorocarbon gum. The curing process typically comprises either extrusion of the compounded mixture into a mold (injection molding) or pressing of the compounded mixture in a mold (press cure), e.g. a cavity or a transfer mold, followed subsequently by oven-curing (post cure). Injection molding of the compounded mixture is usually conducted in two temperature ranges. The compounded mixture is first introduced into an injection barrel whose orifice is typically operated at about 70° C. to 90° C. The mixture is then forced down the extruder barrel with the aid of a mechanical screw. The mold into which the mixture is extruded is typically operated at about 180° C. to 200° C. The resulting molded articles are also typically ultimately subjected to a post-cure at elevated temperatures for an extended period of time, e.g. at temperatures above 200° C. for 16 to 24 hours.

A drawback to the production of many of these conventional fluoroelastomers is their tendency towards "scorching," i.e., the premature or .excessively rapid cure of the compounded composition when exposed to elevated temperatures or high shear conditions that produce a high temperature environment. This scorching behavior is particularly troublesome for injection-molded fluoroelastomers, wherein scorching is characterized by a premature cure initiation occurring prior to and during injection of the compounded composition into a mold. The point of cure initiation for injection-molded fluoroelastomers may be defined as the time after which the compounded fluoroelastomer is subjected to injection molding temperature conditions (i.e., upon introduction into an injection barrel at a temperature above approximately 70° C.) when the curing compound begins to gel or harden. Such a change in physical properties, particularly the corresponding viscosity increase, can greatly reduce processing efficiency by hindering the ability to inject the compounded mixture into a mold.

The point of cure initiation may be manipulated in a conventional bisphenol curing system by varying the concentration of crosslinking agent present in the compounded composition for otherwise identical formulations. An increase in the concentration of the crosslinking agent in the compounded composition is observed to delay the post-compounding cure initiation. Because of the resulting higher crosslink density, however, the resulting physical properties of the cured product under this scheme are also significantly altered. Reducing the amount of accelerator or accelerators in the system also will affect the final physical properties of the cured composition and will alter cure rates in an undesirable manner. Generally, increases in crosslinking agent concentration will raise the maximum torque obtained by an oscillating disk rheometer (ODR) test proportionally and will give the cured end product the characteristics of higher crosslink density fluoroelastomers, e.g. increased hardness, lower compression set, and lower elongation. Specifically, the decrease in elongation at break makes it difficult to demold the cured article from a hot mold cavity without tearing the article. It is desirable to develop a curable fluoroelastomer composition possessing a delayed post-compounding cure initiation and a reduced tendency toward scorching behavior without significantly altering the physical characteristics of the cured end product.

SUMMARY OF THE INVENTION

Briefly, in one aspect, this invention provides a curable fluoroelastomer composition comprising: (A) a fluorine-containing polymer or a blend of fluorine-containing polymers each comprising interpolymerized units derived from one or more fluorine-containing ethylenically unsaturated monomers; (B) an aromatic polyhydroxy crosslinking agent; (C) at least one organo-onium compound; and (D) a monohydroxyflinctional phenol. In another aspect, the present invention provides a method of improving scorch safety of curable fluoroelastomer compositions comprising curing the aforementioned composition.

The combination of an organo-onium compound and a monohydroxyfinctional phenol as incorporated into a curable fluoroelastomer composition in accordance with the present invention provides improved scorch safety of curable fluoroelastomers by providing a delay in post-compounding cure initiation at operating temperatures without significantly affecting the resulting physical properties of the cured product. For lower crosslink density fluoroelastomer compositions, little or no change in resulting properties is observed with the addition of a monofunctional phenol according to this invention.

DETAILED DESCRIPTION OF THE INVENTION

The addition of a desired monohydroxyfunctional phenol to a curable fluoroelastomer composition acts to delay the post-compounding cure initiation over any given range of crosslink densities without significantly affecting the rheological profile of the composition or its resulting physical characteristics when cured. For the purposes of this invention, a delay in cure initiation of 30 seconds or more over an identical fluoroelastomer composition not containing a monohydroxyfunctional phenol is deemed significant, although cure delays of more than several minutes are achieved.

Among the polymers which may be compounded in accordance with this invention are the elastomeric polymers whose interpolymerized units are derived from one or more of the following fluoromonomers: vinylidene fluoride, hexafluoropropene, chlorotrifluoroethylene, 2-chloropentafluoropropene, perfluoromethyl vinyl ether, tetrafluoroethylene, 1-hydropentafluoropropene, dichlorodifluoroethylene, trifluoroethylene, 1,1-chlorofluoroethylene, and mixtures thereof Other terminally ethylenically-unsaturated fluoromonomers are also considered useful provided they contain at least one fluorine atom substituent on each double-bonded carbon atom, each carbon atom of said fluoromonomer being substituted only with fluorine and optionally with chlorine, hydrogen, a lower fluoroalkyl radical, or a lower fluoroalkoxy radical. These fluoromonomers may also be copolymerized with other compounds such as non-fluorinated alpha-olefin co-monomers, e.g. ethylene or propylene. A preferred class of elastomers are copolymers of vinylidene fluoride and at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, a lower fluoroalkyl radical, or a lower fluoroalkoxy radical. Particularly preferred are the elastomers produced by copolymerizing vinylidene fluoride with hexafluoropropene.

Fluoroelastomer copolymers according to the type described above are commercially available as incorporated cure copolymer gumstock that include the curable fluoroelastomer, a suitable crosslinking agent, and certain vulcanization accelerators together in one product. These commercial compositions are sold, for example, under the "Fluorel" trademark by the 3M Company, Saint Paul, Minn. Suitable products of the "Fluorel" line include Fluorel™ FC-2174 Fluoroelastomer (Fluorel™ Fluoroelastomers, product bulletin 98-0211-2133-4, issued 7/85, available from 3M Co., St. Paul, Minn.). Other commercially available products include fluoroelastomers sold under the "Fluorel II," "Viton," "Diael," and "Tecnoflon" trademarks.

A common crosslinking agent for a fluorocarbon elastomer gum is a polyhydroxy compound. The polyhydroxy compound used in its free or non-salt form and as the anionic portion of the onium salt complex can be any of those polyhydroxy compounds that function as a crosslinking agent or co-curative for fluoroelastomers, such as those polyhydroxy compounds disclosed in U.S. Pat. Nos. 3,876,654 (Pattison), and 4,233,421 (Worm). Representative aromatic polyhydroxy compounds include any one of the following: di-, tri-, and tetrahydroxybenzenes, naphthalenes, and anthracenes, and bisphenols of the following formula:

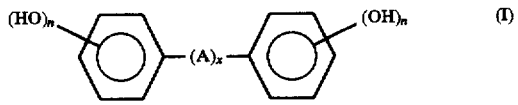
(I)

wherein A is a difunctional aliphatic, cycloaliphatic, or aromatic radical of 1 to 13 carbon atoms, or a thio, oxy, carbonyl, sulfonyl, or sulfonyl radical. A is optionally substituted with at least one chlorine or fluorine atom, x is 0 or 1, n is 1 or 2, and any aromatic ring of the polyhydroxy compound is optionally substituted with at least one atom of chlorine, fluorine, bromine, or with a carboxyl or an acyl radical (e.g. —COR, where R is H or a $C_1$ to $C_8$ alkyl, aryl, or cycloalkyl group) or alkyl radical with, for example, 1 to 8 carbon atoms. It will be understood from the above bisphenol formula that the -H groups can be attached in any position (other than number one) in either ring. Blends of two or more of these compounds may also be used.

One of the most useful and commonly employed aromatic polyhydroxy compounds is 2,2-bis(4-hydroxyphenyl) hexafluoro-propane, known more commonly as bisphenol AF. The compounds 4,4'-dihydroxydiphenyl sulfone (Bisphenol S) and 2,2-bis(4-hydroxyphenyl)propane (bisphenol A) are also considered useful in the present invention. Other useful aromatic polyhydroxy compounds include hydroquinone and dihydroxybenzenes such as, resorcinol, 2-methyl resorcinol, 5-methyl resorcinol, 2-methyl hydroquinone, 2,5-dimethyl hydroquinone, and 2-t-butyl hydroquinone, 1,5-dihydroxynaphthalene and 9,10-dihydroxyanthracene. Still other suitable crosslinking compounds are known in the art and described, for example, in U.S. Pat. Nos. 4,912,171 (Grootaert et al.) and 5,262,490 (Kolb et al.) whose descriptions are incorporated herein by reference.

Many of the organo-onium compounds which are admixed with the fluorine-containing polymer are capable of functioning as a vulcanization accelerator. As is known in the art, an organo-onium is the conjugate acid of a Lewis base (e.g., phosphine, amine, ether, and sulfide) and can be formed by reacting said Lewis base with a suitable alkylating agent (e.g., an alkyl halide or acyl halide) resulting in an expansion of the valence of the electron donating atom of the Lewis base and in a positive charge on the organo-onium compound. Many of the organo-onium compounds useful in the present invention contain at least one heteroatom, i.e., a non-carbon atom such as N, P, S, O, bonded to organic or inorganic moieties. One class of quaternary organo-onium compounds particularly useful in the present invention broadly comprises relatively positive and relatively negative ions wherein a phosphorus, arsenic, antimony or nitrogen generally comprises the central atom of the positive ion, and the negative ion may be an organic or inorganic anion (e.g. halide, sulfate, acetate, phosphate, phosphonate, hydoxide, alkoxide, phenoxide, bisphenoxide, etc.).

The organo-onium compounds useful in this invention are described and known in the art. See, for example, U.S. Pat. Nos. 4,912,171 (Grootaert et al.), 5,086,123 (Guenthner et al.), and 5,262,490 (Kolb et al.) whose descriptions are herein incorporated by reference. Specific representative examples include the following individually listed compounds and mixtures thereof:
triphenylbenzyl phosphonium chloride
tributylallyl phosphonium chloride
tributyl-(2-methoxypropyl)phosphonium chloride
tributylbenzyl ammonium chloride
tetrabutyl ammonium bromide
triaryl sulfonium chloride
tritolyl sulfonium chloride
8-benzyl-1,8-diazabicyclo [5.4.0]-7-undecenium chloride
benzyl tris(dimethylamino) phosphonium chloride
benzyl(diethylamino)diphenylphosphonium chloride The monohydroxyfunctional phenols admixed with the above described compositions act to delay the fluoroelastomer cure at process operating temperatures. These monoor multi-substituted phenols can be represented by the following general formula:

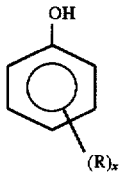

(II)

wherein R is a halogen atom or an acyl, aryl, polyaryl (fused to or separated from the aromatic ring) or alkyl radical substituent (or any combination thereof), the latter three of which may be straight-chained, branched, cyclic, or halogenated. When R is a halogen atom, x may be between 1 and 5, otherwise, x may be between 1 and 3. Additionally, the —R group may optionally contain one or more caternary heteroatoms, i.e. a non-carbon atom such as nitrogen or oxygen. However, where x is one and where the single —T group is a carboxylic acid group and the resulting compound is classifiable as a benzoic acid, (e.g. where R is —COOH), the carboxylic acid substituent must be placed in either the meta or para position on the ring relative to the hydroxyl group. It will be understood from the above formula that the constituent —R group can otherwise be attached in any position in the ring relative to the hydroxy functional group. Preferably, however, to avoid possible steric hindrance of the —OH functionality, said —R group is configured in either the meta or para position relative to the hydroxyl group where said —R group contains more than two carbon atoms. The constituent —R group may contain a phenol where the resulting compound, classifiable as a polyphenol, is monohydroxy functionally hindered by steric effects on one of the hydroxyl groups (i.e. there are one or more substituent groups that contain more than 2 carbon atoms in the meta or para position relative to that hindered hydroxyl group). Such a monohydroxyfunctionally hindered polyphenol will act for the purposes of the present invention as a monophenol, such as, for example, where —R is 2,6-di t-butyl 4-hexafluoropropyl phenol.

The ability of any particular monohydroxyfunctional phenol such as described above to act as a cure initiation inhibitor is believed to be in part a function of the relative acidity of that monohydroxyfunctional phenol with respect to the crosslinking agent used in the fluoroelastomer composition. Accordingly, the particular monohydroxyfunctional phenol chosen for use in a given curable fluoroelastomer composition preferably is more acidic than the crosslinking agent used. For the common, and preferred, example where 2,2-bis(4-hydroxyphenyl)hexafluoropropane (Bisphenol AP) is chosen as the crosslinking agent, a useful monohydroxyfunctional phenol preferably has a Pk$_a$ less than that of Bisphenol AF in the environment of the fluoroelastomer composition.

Especially preferred —R groups are those with strong electron withdrawing capacities such as where R is a cyanide (—CN) or a nitro (—NO$_2$) substituent. Additionally, in accordance with well-known principles governing relative electron withdrawing capacities, these preferred groups are preferentially placed in the para position on the phenyl ring relative to the hydroxyl group, unless R is a halogen atom, in which case it is preferentially placed in the meta position on the phenyl ring relative to the hydroxyl group. Preferred halogenated monophenols include 2,6-dibromophenol and 3,5-dichlorophenol. Pentafluorophenol and pentachlorophenol are also considered useful for the purposes of this invention.

Representative individual constituent -R groups according to the above-described formula I useful in the present invention include the following: —CN, —NO$_2$, —COC$_6$H$_5$, —COCH$_2$C$_6$H$_5$, —COCH$_3$, —COOCH$_3$, —CF$_3$, —NHCH$_2$COOH, —COOH, —C$_6$H$_5$, —CH$_2$OH.

The concentration of the monohydroxyfunctional phenol present in the curable fluoroelastomer composition may be chosen to effect the desired cure delay under processing conditions. The minimum concentration of the monophenol present in the compounded fluoroelastomer mixture to effect a cure delay of 30 seconds over an identically formulated mixture without the monophenol depends on the relative concentration of the polyphenol crosslinking agent. Compositions containing 1 part of crosslinking agent per 100 parts of incorporated cure copolymer gumstock (low crosslink density formulations) require a minimum molar monophenol concentration of one-half the concentration of crosslinking agent to a affect a 30 second cure delay. Compositions containing 2 parts of crosslinking agent 100 parts of incorporated cure copolymer gumstock (high crosslink density formulations) require a minimum molar monophenol concentration of only one-fourth the concentration of crosslinking agent to effect a 30 second cure delay. Above this minimum concentration, a very nearly linear relationship exists between the increase in concentration of the monophenol and the resulting relative cure delay for all crosslink density ranges of interest.

For high crosslink density fluoroelastomer formulations, increases in monophenol concentration is seen to produce a slight rise in compression set for the cured end product over all measured monofunctional phenol concentration ranges. The addition of a monohydroxyfunctional phenol is not, however, seen to significantly alter other physical properties of the cured end product, such as tensile strength, elongation at break, and modulus at 100 percent elongation, for either the low or high crosslink density formulations.

The following examples are offered to aid in a better understanding of the present invention. These examples present and evaluate a number of monohydroxyfinctional phenols. This list is not to be unnecessarily construed as an exhaustive compilation of all monophenols useful in the present invention and the examples are not to be unnecessarily construed as limiting the scope of this invention.

EXAMPLES

A plurality of curable fluorine-containing copolymers of this invention were prepared by mixing the previously described compounds. Observations were made of the cure characteristics and Theological properties of the uncured compositions using ASTM D 2084-93 with a Monsanto Oscillating Disk Rheometer Model 100S, using a small disk (AR177, available from Monsanto, Inc.) with the following conditions: no preheat, oscillator frequency of 100 cpm and a 3° arc, at 177° C. Specifically, the samples were evaluated for Minimum Torque (ML), Maximum Torque (MH) (or the highest torque attained during a specified period of time where no plateau or maximum torque is obtained), time t,2, representing the time to a 2 inch-lb (2.26 dN-meter) rise in viscosity, reported in minutes. The times t'50 and t'90, respectively, represent the time necessary to reach the torque 50% of the distance between the minimum torque and the maximum torque and the torque 90% of the distance between the minimum torque and the maximum torque, also reported in minutes.

Mooney Scorch characteristics were determined in accordance with ASTM D1646-94 using a Monsanto Mooney Viscometer (Model 2000) with a 1 minute preheat and a small rotor at a temperature of 121° C. The results are reported as Mooney Minimum Viscosity, reported in Mooney units, and Mooney Scorch ($t_{10}$), reported in minutes. The Mooney minimum viscosity is the minimum, or lowest, viscosity recorded during the test. Mooney Scorch represents the time required to increase viscosity 10 Mooney units from the minimum viscosity.

Compression set, reported as a percent, was determined in accordance with ASTM D 395-89 (method B) using O-rings with a 3.5 mm cross-section at 200° C. for 70 hours.

Tensile strength, elongation at break and modulus at 100 percent elongation were measured in accordance with ASTM D 412-92$^{e1}$, using Die D. Hardness was measured in accordance with ASTM D 2240-91, using Durometer A and taking readings 2 seconds after the presser foot came into contact with the specimen. All composition percentages are given in weight percent unless otherwise noted.

Example 1

Example 1, an example of the invention, was prepared by compounding the following ingredients in a conventional manner on a two-roll mill: 100 g of a fluorine-containing copolymer of 60 wt % vinylidene fluoride ($VF_2$) and 40 wt % hexafluoropropene (HFP) with a Mooney viscosity of about 37, available from 3M Co. as Fluorel™ Fluoroelastomer FC-2230, 0.35 g (0.0009 moles) triphenylbenzylphosphonium chloride, 1.0 g (0.003 moles) 4,4'-(hexafluoroisopropylidene)diphenol (Bisphenol AF), 6 g of $Ca(OH)_2$, 3 g of MgO, 30 g of Thermax™ carbon black N-990, and 0.595 g (0.003 moles) of 4-hydroxy benzophenone, a monohydroxyfunctional phenol as shown in Table 1. The cure characteristics and rheological properties of the uncured compositions were determined and are reported in Table 2.

Press-cured sheets, 150 mm×150 mm×2 mm, were formed from the curable fluorine-containing copolymer mixture by pressing in a mold at about 6.9 MPa for 15 minutes at 177° C. The sheets were removed from the press and placed in a circulating oven set at 230° C. for 16 hours. Physical properties were then measured on the post-cured sheet and are reported in Table 3.

Comparative Example C1

For Comparative Example C1, a sample was prepared and evaluated as in Example 1 except the substituted monohydroxyfunctional phenol, 4-hydroxy benzophenone, was omitted. The cure characteristics and rheological properties of the uncured composition are reported in Table 1, and the physical properties of their post-cured sheets are reported in Table 3.

Examples 2–8

For Examples 2–8, a series of substituted monohydroxyfunctional phenols of the formula

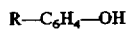

$$R-C_6H_4-OH \quad (I)$$

were evaluated. The substituent R was varied as listed in Table 1, along with the location of R in relation to —OH. All materials were obtained from Aldrich Chemical Co., Inc. unless otherwise indicated. The cure characteristics and rheological properties of the uncured compositions are reported in Table 2, and the physical properties of their post-cured sheets are reported in Table 3.

TABLE 1

| Example | R | Location of "R" |
|---|---|---|
| 1 | $C_6H_5CO-$ | para |
| 2 | $C_6H_5CH_2CO-$ | para |
| 3 | $CN-$ | para |
| 4 | $CN-$ | ortho |
| 5 | $CH_3CO-$ | para |
| 6 | $O_2N-$ | para |
| 7 | $O_2N-$ | ortho |
| 8 | $O_2N-$ | meta |

TABLE 2

| Example | $T_{MAX}$ (MH) | $T_{MIN}$ (ML) | $t_s2$ (min.) | t'50 (min.) | t'90 (min.) | Mooney minimum | $t_{10}$ (min.) |
|---|---|---|---|---|---|---|---|
| 1 | 57.5 | 10 | 2.5 | 3.6 | 4.4 | 39.0 | 104.9 |
| 2 | 60 | 9.7 | 3.4 | 4.7 | 6.1 | 36.5 | — |
| 3 | 54 | 8 | 2.7 | 3.8 | 4.1 | 36.4 | 96.9 |
| 4 | 61 | 12 | 2.2 | 3.3 | 4.9 | 39.3 | 69.1 |
| 5 | 58 | 9.6 | 2.5 | 3.6 | 4.7 | 36.8 | 94.6 |
| 6 | 57 | 11 | 4.2 | 5.7 | 7.2 | 41.5 | >180 |
| 7 | 59 | 11 | 2.0 | 3.4 | 5.7 | 44.4 | 58.2 |
| 8 | 56 | 10 | 2.5 | 3.5 | 4.7 | 40.8 | 103.9 |
| C1 | 38 | 12 | 1.3 | 1.9 | 3.4 | 35.8 | 28.4 |

The results in Table 2 show the examples of the invention exhibit the desired delay in the cure curve. Values of $t_s2$, t'50 and t'90 for the examples of the invention are longer than the comparable values for Comparative Example C 1. Also, the times available for processing, as shown by Mooney Scorch, $t_{10}$, are all longer for Examples 1–8 when compared to Comparative Example C1.

The results of testing post cured sheets for certain physical properties on are shown in Table 3.

TABLE 3

| Example | Tensile (MPa) | Elongation at break (%) | Modulus (MPa) | Hardness | Comp. Set (%) |
|---|---|---|---|---|---|
| 1 | 13.8 | 310 | 3.2 | 73 | 31.5 |
| 2 | 13.4 | 243 | 4.0 | 76 | 37.4 |
| 3 | 14.4 | 316 | 2.8 | 73 | 26.4 |
| 4 | 14.7 | 319 | 3.0 | 73 | 26.4 |
| 5 | 13.4 | 308 | 3.0 | 74 | 28.5 |
| 6 | 12.7 | 291 | 2.8 | 73 | 28.3 |
| 7 | 13.4 | 314 | 2.8 | 72 | 30.9 |
| 8 | 13.1 | 310 | 3.0 | 73 | 24.4 |
| C1 | 9.3 | 380 | 2.2 | 72 | 41.0 |

The data of Table 3 show no substantial loss in physical properties in the samples of the invention, that show a delayed cure, as compared to Comparative Example C1.

Examples 9–20

For Examples 9–20, samples of the invention were made as in Example 1 except the "R" group of the monohydroxyfinctional phenols of Formula I were varied as shown in Table 4. All materials were obtained from Aldrich Chemical Co., Inc. unless otherwise indicated.

Comparative Examples C2 and C3

For Comparative Examples C2 and C3, samples were made as in Example 1 except that the "R" group of each was selected, as shown in Table 4, to be a group that was more electron donating instead of electron withdrawing, as in the examples of the invention. The cure characteristics and rheological properties of the uncured compositions of these examples are reported in Table 5, and the physical properties of their post-cured sheets and are reported in Table 6.

TABLE 4

| Example | "R" | Location of "R" |
|---|---|---|
| 9 | $CH_3O_2C$— | para |
| 10 | $F_3C$— | para |
| 11 | F— | 3,4-difluoro |
| 12 | Cl— | para |
| 13 | Br— | para |
| 14 | $HO_2CCH_2HN$— | para |
| 15 | HOOC— | para |
| 16 | HOOC— | meta |
| 17 | $C_6H_5$— | para |
| 18 | $HOCH_2$— | para |
| 19 | $CH_3CONH$— | ortho |
| 20 | $CH_3CONH$— | para |
| C2 | $(CH_3)_2NCH_2$— | para |
| C3 | $CH_3O$— | para |

Cur characteristics and rheological data were measured as in Example 1 and the results are reported in Table 5. Values for Comparative Example C1 are included for reference.

TABLE 5

| Example | (MH) | (ML) | $t_s2$ (min.) | t'50 (min.) | t'90 (min.) | Mooney minimum | $t_{10}$ (min.) |
|---|---|---|---|---|---|---|---|
| 9 | 59.5 | 10.5 | 2.1 | 2.9 | 3.9 | 36.8 | 98.3 |
| 10 | 43.0 | 7.5 | 1.7 | 2.6 | 5.0 | — | — |
| 11 | 58.0 | 10.5 | 1.3 | 1.8 | 2.7 | — | — |
| 12 | 56.0 | 10.0 | 1.8 | 2.7 | 3.5 | — | — |
| 13 | 54.0 | 9.0 | 1.8 | 2.5 | 3.4 | — | — |
| 14 | 47.0 | 11.0 | 1.9 | 2.9 | 4.3 | 37.4 | 76.0 |
| 15 | 51.0 | 10.5 | 2.2 | 3.5 | 5.3 | 37.2 | 100.3 |
| 16 | 48.0 | 10.6 | 2.2 | 3.5 | 5.6 | 37.4 | 98.2 |
| 17 | 57.0 | 11.0 | 2.1 | 3.1 | 3.8 | 35.4 | 102.3 |
| 18 | 46.0 | 10.4 | 2.1 | 3.4 | 5.3 | 39.1 | 95.6 |
| 19 | 55.0 | 9.0 | 1.9 | 2.8 | 4.2 | 38.4 | 74.9 |
| 20 | 55.0 | 10.0 | 2.0 | 3.0 | 3.9 | 36.9 | 72.6 |
| C2 | 47.5 | 10.6 | 1.3 | 2.0 | 2.6 | 36.2 | 32.5 |
| C3 | 51.0 | 10.2 | 1.5 | 2.3 | 3.1 | 35.2 | 59.6 |
| C1 | 38.0 | 12.0 | 1.3 | 1.9 | 3.4 | 35.8 | 28.4 |

The results in Table 5 indicate a delay in the cure in the examples of the invention that contain either a halogen atom or a strong electron withdrawing substituent as compared to the Comparative Examples C1, C2, and C3. This is demonstrated by the longer times for t'2, t'50 and t'90 for the examples of the invention. Although Example 11 shows no delay in this data, when the monohyroxyfunctional phenol used in Example 11 is tested at a higher concentration (0.009 moles) in the Mooney Scorch test, run at 122° C., a minor delay effect is noted. Examples 14 and Examples 17–20 show a slight delay effect even though the "R" groups are not strongly electron-withdrawing. This may be due to other factors governing the mechanism of the bisphenol cure system including relative solubilities of the phenols in the fluoroelastomer gum system.

Table 6 presents the physical properties of the post-cured sheets of some of the above examples. Again, the data of Comparative Example C1 is included for reference.

TABLE 6

| Example | Tensile (MPa) | Elongation at break (%) | Modulus (MPa) | Hardness | Comp. Set (%) |
|---|---|---|---|---|---|
| 9 | 13.7 | 312 | 3.0 | 74 | 28.9 |
| 14 | 11.0 | 294 | 2.9 | 73 | 34.5 |
| 15 | 12.7 | 324 | 2.8 | 72 | 35.5 |
| 16 | 12.9 | 328 | 2.7 | 72 | 34.2 |
| 17 | 12.7 | 333 | 2.8 | 73 | 35.3 |
| 18 | 12.0 | 340 | 2.7 | 73 | 34.0 |
| 19 | 12.3 | 253 | 3.4 | 72 | 37.7 |
| 20 | 11.5 | 248 | 3.6 | 75 | 33.5 |
| C2 | 12.8 | 306 | 3.0 | 72 | 48.6 |
| C3 | 11.6 | 312 | 2.6 | 72 | 39.0 |
| C1 | 9.3 | 380 | 2.2 | 72 | 41.0 |

The results of Table 6 further demonstrate that the addition of a monohydroxyflinctional phenol in accordance with the present invention does not significantly effect the resulting physical properties of the cured fluoroelastomer.

Comparative Example C4

For Comparative Example C4, a composition was made in a manner similar to example 1 except 2,6-di-t-butylphenol was used instead of 4-hydroxy benzophenone.

Examples 21–22

For Examples 21–22, curable fluoroelastomer compositions of the invention were made and evaluated as in Example 1 except that the monohydroxyfiunctional phenol was varied as listed in Table 7. All materials were obtained from Aldrich Chemical Co., Inc.

TABLE 7

| Example | Monohydroxyfunctional Phenol |
|---|---|
| C4 | 2,6-di-t-butylphenol |
| 21 | 3,5-dichlorophenol |
| 22 | 2,6-dibromophenol |

Cure characteristics and rheological data were measured as in Example 1 and the results are listed in Table 8.

TABLE 8

| Example | (MH) | (ML) | $t_s2$ (min.) | t'50 (min.) | t'90 (min.) | Mooney minimum | $t_{10}$ (min.) |
|---|---|---|---|---|---|---|---|
| 21 | 62 | 10 | 2.9 | 3.9 | 4.8 | — | — |
| 22 | 61 | 11 | 2.3 | 4.2 | 11.8 | 43.0 | 79.6 |
| C4 | 46 | 10.8 | 1.5 | 2.3 | 3.5 | 35.9 | 49.3 |

The results in Table 8 indicate that although Comparative Example C4 is technically a monophenol, it does not act like the other monohydroxyfunctional phenols, i.e., it does not show the delay of cure initiation. This may be because the —OH group may be sterically hindered by the two nearby tertiary-butyl groups.

Physical properties were measured on post-cured sheets of the above examples as in Example 1 and the results are shown in Table 9.

TABLE 9

| Example | Tensile (MPa) | Elongation (%) | Modules (MPa) | Hardness | Comp. Set (%) |
|---------|---------------|----------------|---------------|----------|---------------|
| 21 | 12.1 | 311 | 2.8 | 72 | 32.4 |
| 22 | 13.9 | 313 | 3.1 | 73 | 29.6 |
| C4 | 11.7 | 331 | 2.9 | 74 | 36.2 |

The results of Table 9 further demonstrate that the addition of a monohydroxyfinctional phenol in accordance with the present invention does not significantly effect the resulting physical properties of the cured fluoroelastomer.

Examples 23–32

For Examples 23–32, curable fluoroelastomer compositions of the invention were made and evaluated in a manner similar to Example 1 in which the concentration of the monohydroxyfunctional phenol and the crosslinking agent, Bisphenol AF, were varied.

For Example 23, the composition included only 0.0015 moles of 3,5,dichlorophenol, a monohydroxyfunctional phenol as described above in Table 7 and 1.0 g (0.003 moles) Bisphenol AF.

For Examples 24–32, samples were made in a manner similar to Example 23 except the monohydroxyfinctional phenol concentration and/or crosslinking agent concentration were varied as shown in Table 10. For examples 23–27, the concentration of triphenylbenzylphosphonium chloride used was 0.0009 mol. For examples 28–32 where the concentration of bisphenol AF was increased to 0.006 mol., the concentration of triphenylbenzylphosphonium chloride used was 0.0013 mol.

Comparative Examples C1 and C5

The composition of Comparative Example C1, presented earlier, is similar to the composition of Example 23 without the monohydroxyfunctional phenol.

Comparative Example C5 was made in a similar manner to Examples 28 except that no monohydroxyfunctional phenol was added.

TABLE 10

| Example | Bisphenol AF Concentration (moles) | Mono-phenol Concentration (moles) |
|---------|-----------------------------------|-----------------------------------|
| C1 | 0.003 | 0.0 |
| 23 | 0.003 | 0.0015 |
| 24 | 0.003 | 0.003 |
| 25 | 0.003 | 0.006 |
| 26 | 0.003 | 0.009 |
| 27 | 0.003 | 0.012 |
| C5 | 0.006 | 0.0 |
| 28 | 0.006 | 0.0015 |
| 29 | 0.006 | 0.003 |
| 30 | 0.006 | 0.006 |
| 31 | 0.006 | 0.009 |
| 32 | 0.006 | 0.012 |

The above examples were evaluated as in Example 1 and the cure and rheological properties are reported in Table 11.

TABLE 11

| Example | (MH) | (ML) | $t_s2$ (min.) | t'50 (min.) | t'90 (min.) |
|---------|------|------|---------------|-------------|-------------|
| C1 | 38.0 | 12.0 | 1.3 | 1.9 | 3.4 |
| 23 | 49.0 | 10.1 | 2.1 | 3.2 | 5.2 |
| 24 | 54.5 | 10.0 | 3.7 | 4.8 | 6.4 |
| 25 | 60.0 | 8.5 | 7.0 | 8.5 | 9.4 |
| 26 | 62.5 | 10.0 | 16.8 | 18.7 | 20.4 |
| 27 | 64.0 | 10.0 | 24.0 | 26.2 | 29.7 |
| C5 | 114 | 11.0 | 3.4 | 5.0 | 5.5 |
| 28 | 122 | 9.0 | 4.3 | 5.9 | 6.4 |
| 29 | 120 | 10.0 | 5.5 | 6.6 | 7.2 |
| 30 | 110 | 9.5 | 8.0 | 9.6 | 10.4 |
| 31 | 114 | 10.0 | 13.9 | 15.8 | 17.0 |
| 32 | 114 | 10.0 | 21.4 | 23.5 | 25.1 |

The results in Table 11 indicate that the cure delay effects are present when the monohydroxfinctional phenol is present in concentrations as little as 0.0015 moles for formulations high in Bisphenol AF concentration (high crosslink density), and as little as 0.0015 for formulations low in Bisphenol AF concentrations (low crosslink density). Cure delay effects can be influenced by varying the concentration of cross-linkers, such as polyhydroxy compounds, but this may also change other physical properties, such as MH or elongation as shown below in Table 12.

Physical properties were measured on post-cured sheets as in Example 1 and the results are shown in Table 12.

TABLE 12

| Example | Tensile (MPa) | Elongation (%) | Modulus (MPa) | Hardness | Comp. Set (%) |
|---------|---------------|----------------|---------------|----------|---------------|
| C1 | 9.3 | 380 | 2.2 | 72 | 41.0 |
| 23 | 11.4 | 342 | 2.6 | 72 | 41.6 |
| 24 | 12.1 | 311 | 2.8 | 72 | 32.4 |
| 25 | 14.0 | 294 | 3.0 | 72 | 32.9 |
| 26 | 13.0 | 248 | 3.1 | 72 | 32.4 |
| 27 | 14.1 | 255 | 3.2 | 72 | 36.1 |
| C5 | 14.3 | 183 | 6.9 | 80 | 14.5 |
| 28 | 13.8 | 167 | 7.3 | 81 | 15.8 |
| 29 | 13.3 | 161 | 6.8 | 81 | 17.4 |
| 30 | 14.6 | 176 | 7.1 | 80 | 18.1 |
| 31 | 14.8 | 153 | 8.0 | 80 | 21.4 |
| 32 | 14.1 | 153 | 8.2 | 80 | 22.7 |

The results in Table 12 indicate significant changes in physical properties occur when the cross-linker concentration is increased giving, in general, higher tensiles, lower elongations higher modulus and hardness and lower compression set as shown by comparing Comparative Examples C1 and C5. The addition of the monohydroxyfunctional phenol does not substantially alter this relationship.

Example 33

For Example 33, a sample of the invention was prepared and evaluated in a manner similar to Example 1 except that triarylsulfonium chloride, as made according to the method described in U.S. Pat. No. 4,233,421 (Worm) Example 1, was used instead of triphenylbenzylphosphonium chloride and para-nitrophenol was substituted for 4-hydroxy benzophenone on an equal molar basis.

Comparative Example C6

For Comparative Example C6, a sample was made and evaluated as in Example 33 except that the para-nitrophenol was omitted.

Example 34

Example 34, a sample of the invention, was prepared and evaluated in a manner similar to Example 1 except that tributylbenzylammonium chloride was substituted for triphenylbenzylphosphonium chloride and para-nitrophenol was substituted for 4-hydroxy benzophenone, both substitutions made on an equal molar basis.

Comparative Example C7

For Comparative Example C7, a sample was made and evaluated as in Example 34 except the para-nitrophenol was omitted.

Example 35

For Example 35, a sample of the invention was prepared and evaluated in a manner similar to Example 1 except that tributylmethoxypropylphosphonium chloride was substituted for triphenylbenzylphosphonium chloride and para-nitrophenol was substituted for 4-hydroxy benzophenone, both substitutions made on an equal molar basis.

Comparative Example C8

For Comparative Example C8, a sample was made and evaluated as in Example 35 except that the para-nitrophenol was omitted.

The cure and Theological properties and the post-cured physical properties of the above examples are presented in Tables 13 and 14 respectively.

TABLE 13

| Example | (MH) | (ML) | $t_s2$ (min.) | t'50 (min.) | t'90 (min.) | Mooney minimum | $t_{10}$ (min.) |
|---|---|---|---|---|---|---|---|
| 33 | 29.5 | 9.5 | 11.7 | 14.8 | 17.6 | 37.2 | 90+ |
| C6 | 25.0 | 10 | 3.0 | 3.8 | 4.9 | 37.7 | 90+ |
| 34 | 56.0 | 10 | 3.6 | 4.9 | 5.9 | 36.6 | 90+ |
| C7 | 49.5 | 12 | .95 | 1.6 | 2.0 | 37.1 | 31.2 |
| 35 | 62.0 | 10 | 2.4 | 3.5 | 4.3 | 36.5 | 74.5 |
| C8 | 57.0 | 12 | 0.9 | 1.3 | 1.7 | 36.4 | 16.3 |

The results in Table 13 indicate each example of the invention exhibits the desired cure delay when compared to a similar sample without a monohydroxyfunctional phenol. The $t_{10}$ values of 90+ indicate the test was run for 90 minutes and the viscosity had not yet reached a 10 point viscosity increase, at which point the test was stopped.

Physical properties were measured on post-cured sheets as in Example I and the results are shown in Table 14.

TABLE 14

| Example | Tensile (MPa) | Elongation (%) | Modulus (MPa) | Hardness | Comp. Set (%) |
|---|---|---|---|---|---|
| 33 | 1234 | 436 | 317 | 72 | 48.1 |
| C6 | 868 | 730 | 273 | 68 | 75.5 |
| 34 | 1919 | 284 | 451 | 73 | 30.4 |
| C7 | 1763 | 358 | 390 | 72 | 39.0 |
| 35 | 1805 | 237 | 478 | 73 | 24.2 |
| C8 | 1859 | 289 | 443 | 72 | 27.6 |

The results of both Tables 13 and 14 indicate similar effects in cure delay and post-cure physical properties in the examples of the invention with various oniums when compared to similar compositions without a monohydroxyfunctional phenol.

Example 36

For Example 36, a sample of the invention was made and evaluated in a manner similar to Example 35 except that the gum used was a fluorine-containing terpolymer of 45 wt % $VF_2$, 23 wt % TFE and 32 wt % HFP, available from 3M Co. as Fluorel™ Fluoroelastomer FT-2481.

Comparative Example C9

For Comparative Example C9, a sample was made and evaluated as in Example 36 except that the para-nitrophenol was omitted.

Example 37

For Example 37, a sample of the invention was made and evaluated in a manner similar to Example 36 except that the concentration of tributylmethoxypropylphosphonium chloride was increased to 0.0024 mol. and the gum used was a fluorine-containing terpolymer of 30 wt % $VF_2$, 55 wt % TFE and 15 wt % propylene, available from 3M Co. as Fluorel™ Fluoroelastomer FX-11705.

Comparative Example C10

For Comparative Example C10, a sample was made and evaluated as in Example 36 except that the para-nitrophenol was omitted.

The above examples were evaluated as in Example 1 and the cure and Theological properties are reported in Table 15. The $t_{10}$ values of 90+ indicate the test was run for 90 minutes and the $t_{10}$ value had not yet reached a 10 point viscosity increase.

TABLE 15

| Example | (MH) | (ML) | $t_s2$ (min.) | t'50 (min.) | t'90 (min.) | Mooney minimum | $t_{10}$ (min.) |
|---|---|---|---|---|---|---|---|
| 36 | 52.0 | 21.0 | 4.2 | 5.5 | 6.8 | 66.3 | 90+ |
| C9 | 55.0 | 25.8 | 1.2 | 1.9 | 2.8 | 66.2 | 28.1 |
| 37 | 48.0 | 14.0 | 5.9 | 8.2 | 10.7 | 38.3 | 90+ |
| C10 | 46.0 | 14.0 | 2.5 | 4.0 | 6.6 | 34.4 | 35.0 |

The results in Table 15 show a delay before the onset of cure in each example of the invention when compared to the sample without the monohydroxyfunctional phenol.

Physical properties of the above examples were measured on post-cured sheets as in Example 1 and the results are shown in Table 16.

TABLE 16

| Example | Tensile (MPa) | Elongation (%) | Modulus (MPa) | Hardness | Comp. Set (%) |
|---|---|---|---|---|---|
| 36 | 13.7 | 310 | 2.9 | 73 | 41.9 |
| C9 | 12.3 | 341 | 3.0 | 73 | 50.2 |
| 37 | 12.8 | 199 | 4.9 | 75 | 52.9 |
| C10 | 12.2 | 275 | 3.7 | 74 | 60.7 |

The results in Table 16 indicate useful properties are obtained with the addition of the monohydroxyfunctional phenol.

Examples 38–41

For Example 38, a curable fluoroelastomer composition of the invention was made and evaluated in a manner similar to Example 6 except the cross-linker, Bisphenol AF, was replaced with 0.006 moles of 4,4'-sulfonyldiphenol, available from Aldrich Chemical Company, Inc., and the triphenylbenzylphosphonium chloride was used at the 0.0013 molar level.

For Example 39, a curable fluoroelastomer composition of the invention was made and evaluated in a manner similar to Example 38 except the cross-linker used was 0.006 moles of 4,4'-isopropylidenediphenol (commonly known as bisphenol A), available from Aldrich Chemical Company, Inc.

For Example 40, a curable fluoroelastomer composition of the invention was made and evaluated in a manner similar to Example 38 except the cross-linker used was 0.006 moles of 4,4'-dihydroxybenzophenone, available from Aldrich Chemical Company, Inc.

For Example 41, a curable fluoroelastomer composition of the invention was made and evaluated in a manner similar to Example 38 except that amount of Ca(OH)$_2$ used was 2.0 g, the amount of MgO used was 4.0 g, and the cross-linker used was 0.006 moles of a fluorinated diol made as described in Example 1 of U.S. Pat. No. 5,266,650 (Guerra et al.) with a molecular weight of 1250 instead of 1500, and with an average hydroxyl functionality of 1.7 instead of 1.8.

Comparative Examples C11–C14

For Comparative Examples C11–C 14, samples were made and evaluated as in Examples 38–41 respectively, except the monohydroxyfunctional phenol, para-nitrophenol, was omitted in each case.

The test results for above examples for the cure and Theological properties are reported in Table 17 and the physical properties are reported in Table 18

TABLE 17

| Example | (MH) | (ML) | t,2 (min.) | t'50 (min.) | t'90 (min.) | Mooney minimum | t$_{10}$ (min.) |
| --- | --- | --- | --- | --- | --- | --- | --- |
| 38 | 49.0 | 9.5 | 6.0 | 7.9 | 10.1 | 37.6 | 90+ |
| C11 | 41.0 | 11.0 | 2.8 | 4.8 | 8.3 | 39.4 | 79.8 |
| 39 | 92.0 | 10.0 | 2.7 | 3.6 | 4.7 | 38.8 | 55.2 |
| C12 | 69.0 | 11.0 | 2.0 | 3.5 | 4.2 | 35.2 | 37.6 |
| 40 | 66.0 | 8.0 | 3.8 | 5.3 | 7.9 | 36.4 | 90+ |
| C13 | 52.0 | 10.5 | 2.7 | 4.4 | 7.1 | 36.2 | 73.3 |
| 41 | 68.0 | 7.5 | 1.8 | 3.2 | 5.5 | 26.9 | 33.3 |
| C14 | 46.0 | 7.0 | 1.9 | 4.7 | 8.9 | 22.1 | 10.9 |

The results in Table 17 indicate a delay in cure initiation in each example of the invention when compared to its comparative example without the monohydroxyfunctional phenol when using the Mooney Scorch values.

Physical properties were measured on post-cured sheets as in Example 1 and the results are shown in Table 18.

TABLE 18

| Example | Tensile (MPa) | Elongation (%) | Modulus (MPa) | Hardness | Comp. Set (%) |
| --- | --- | --- | --- | --- | --- |
| 38 | 11 | 282 | 3.0 | 76 | 26.3 |
| C11 | 10.6 | 361 | 2.9 | 76 | 40.1 |
| 39 | 12.8 | 182 | 5.5 | 81 | 28.2 |
| C12 | 12.0 | 256 | 4.0 | 78 | 28.4 |
| 40 | 12.6 | 232 | 4.0 | 78 | 20.0 |
| C13 | 11.9 | 305 | 3.2 | 76 | 26.4 |
| 41 | 12.8 | 281 | 2.6 | 65 | 18.9 |
| C14 | 11.8 | 313 | 2.3 | 64 | 23.3 |

The results in Table 18 indicate useful properties are obtained with the addition of the monohydroxyfunctional phenol.

Various modifications and alterations of this invention will become apparent to those skilled in the art without departing from the scope and spirit of the present invention, and it should be understood that this invention is not to be unduly limited to the illustrative embodiments set forth hereinabove.

We claim:

1. A curable fluoroelastomer composition comprising:
   (a) a fluorine-containing polymer or blend of fluorine-containing polymers each comprising interpolymerized units derived from one or more fluorine-containing ethylenically unsaturated monomers;
   (b) an aromatic polyhydroxy crosslinking agent;
   (c) at least one organo-anium compound; and
   (d) a monohydroxyflnctional phenol capable of delaying the post-compounding initiation of the curable fluoroelastomer composition without significantly affecting the physical properties of the composition when cured.

2. The composition of claim 1 wherein the monohydroxyfunctional phenol is selected from the group consisting of p-nitrophenol, p-cyanophenol, and 4-hydroxy benzophenone.

3. The composition of claim 1 wherein the aromatic polyhydroxy crosslinking agent is 2,2-bis(4-hydroxyphenyl) hexafluoro-propane.

4. The composition of claim 1 wherein one or more of the organo-onium compounds are selected from the group consisting of triphenylbenzylphospbonium chloride, triarylsulfonium chloride, tributylbenzylamonium chloride, and tributylmethoxypropylphosphonium chloride.

5. The composition of claim 1 wherein one or more of the fluorine-containing polymers comprise a copolymer of vinylidene fluoride and at least one terminally ethylenically-unsaturated fluoromonomer.

6. The composition of claim 1 wherein one or more of the fluorine-containing polymers comprise a copolymer of vinylidene fluoride and hexafluoropropene.

7. The composition of claim 1 wherein one or more of the fluorine-containing polymers comprise a copolymer of vinylidene fluoride, hexafluoropropene, and tetrafluoroethylene.

8. A curable fluoroelastomer composition comprising:
   (a) a fluorine-containing polymer or blend of fluorine-containing polymers each comprising interpolymerized units derived from one or more fluorine-containing ethylenically unsaturated monomers;
   (b) an aromatic polyhydroxy crosslinking agent;
   (c) at least one organo-onium compound; and
   (d) a monohydroxyfunctional phenol capable or delaying the post-compounding initiation of the curable fluoroelastomer composition without significantly affecting the physical properties of the composition when cured said phenol having the general formula:

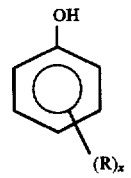

wherein R may be placed on any position relative to the aromatic ring and is a halogen atom or an acyl, cyano, nitro aryl, polyaryl, cyano, nitro or alkyl radical substituent, the latter three of which may be straight-chained, branched, cyclic, or halogenated, and wherein R may optionally contain one or more caternary heteroatoms with the proviso that when R is or contains a hydroxy group said hydroxy group is sterically hindered; and x may be between 1 and 5 inclusive when R is a halogen, otherwise, x may be between 1 and 3 inclusive.

9. The composition of claim 8 wherein the monohydroxy-functional phenol is selected from the group consisting of p-nitrophenol, p-cyanophenol, and 4-hydroxy benzophenone.

10. The composition of claim 8 wherein the aromatic polyhydroxy crosslinking agent is 2,2-bis(4-hydroxyphenyl)hexafluoro-propane.

11. The composition of claim 8 wherein one or more of the organo-onium compounds are selected from the group consisting of triphenylbenzylphosphonium chloride, triarylsulfonium chloride, tributylbenzylammonium chloride, and tributylmethoxypropylphosphonium chloride.

12. The composition of claim 8 wherein one or more of the fluorine-containing polymers comprise a copolymer of vinylidene fluoride and at least one terminally ethylenically-unsaturated fluoromonomer.

13. The composition of claim 8 wherein one or more of the fluorine-containing polymers comprise a copolymer of vinylidene fluoride and hexafluoropropene.

14. The composition of claim 8 wherein one or more of the fluorine-containing polymers comprise a copolymer of vinylidene fluoride, hexafluoropropene, and tetrafluoroethylene.

15. A method of making a shaped elastomeric article comprising curing the composition of claim I to form the article.

16. A method of making a shaped elastomeric article comprising curing the composition of claim 8 to form the article.

17. The method of claim 15 wherein the curing comprises injection molding.

18. The method of claim 16 wherein the curing comprises injection moldings.

19. A cured fluoroelastomer article comprising the composition of claim 1.

20. A cured fluoroelastomer article comprising the composition of claim 8.

21. A curable fluoroelastomer composition comprising:
(a) a fluorine-containing polymer or blend of fluorine-containing polymers each comprising interpolymerized units derived from one or more fluorine-containing ethylenically unsaturated monomers;
(b) an aromatic polyhydroxy crosslinking agent;
(c) at least one organo-onium compound; and
(d) a monohydroxyfunctional phenol having the general formula:

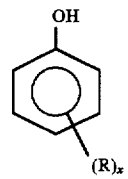

wherein R may be placed on any position relative to the aromatic ring and is an electron withdrawing acyl, cyano, nitro aryl, polyaryl, or alkyl radical substituent, the latter tree of which may be straight-chained, branched, cyclic, or halogenated, and wherein R may optionally contain one or more catenary heteroatoms with the proviso that when R is or contain a hydroxy group said hydroxy group is sterically hindered; and x may be between 1 and 5 inclusive when R is a halogen, otherwise, x may be between 1 and 3 inclusive.

22. The composition of claim 21 wherein said R group is selected from the group consisting of: —CN, —NO$_2$, —COC$_6$H$_5$, —COCH$_2$C$_6$H$_5$, —COCH$_3$, —COOCH$_3$, —CF$_3$, —NHCH$_2$COOH, —COOH, —C$_6$H$_5$, —CH$_2$OH.

23. A curable fluoroelastomer composition comprising:
(a) a fluorine-containing polymer or blend of fluorine-containing polymers each comprising interpolymerized units derived from one or more fluorine-containing ethylenically unsaturated monomers;
(b) an aromatic polyhydroxy crosslinking agent;
(c) at least one organo-onium compound; and
(d) a monohydroxyfunctional phenol capable of effecting a cure delay of 30 seconds or more over an identically formulated mixture without the monohydroxyfunctional phenol.

* * * * *

UNITED STATES PATENT AND TRADEMARK OFFICE
CERTIFICATE OF CORRECTION

PATENT NO.: 5,756,588

DATED: May 26, 1998

INVENTOR(S): Robert E. Kolb, Naiyong Jing

It is certified that error appears in the above-identified patent and that said Letters Patent is hereby corrected as shown below:

Col. 16, line 11, "anium" should read -- onium --.

Col. 16, line 12, "monohydroxyflnctional" should read -- monohydroxyfunctional --.

Col. 16, line 25, "triphenylbenzylphospbonium" should read -- triphenylbenzylphosphonium --.

Col. 18, line 19, "tree" should read -- three --.

Signed and Sealed this

Twenty-second Day of June, 1999

Q. TODD DICKINSON

Attest:

Attesting Officer

Acting Commissioner of Patents and Trademarks